United States Patent
De Kock

(10) Patent No.: US 11,358,347 B2
(45) Date of Patent: Jun. 14, 2022

(54) MANUFACTURING FIBER-REINFORCED THERMOPLASTIC CONCENTRATES

(71) Applicant: JOHNS MANVILLE, Denver, CO (US)

(72) Inventor: Daniel P De Kock, Assenede (BE)

(73) Assignee: Johns Manville, Denver, CO (US)

( * ) Notice: Subject to any disclaimer, the term of this patent is extended or adjusted under 35 U.S.C. 154(b) by 547 days.

(21) Appl. No.: 16/281,273

(22) Filed: Feb. 21, 2019

(65) Prior Publication Data
US 2020/0269529 A1    Aug. 27, 2020

(51) Int. Cl.
*B29C 70/52*    (2006.01)
*C08J 5/04*    (2006.01)
*B29K 105/06*    (2006.01)

(52) U.S. Cl.
CPC .......... *B29C 70/523* (2013.01); *B29C 70/525* (2013.01); *C08J 5/04* (2013.01); *B29K 2105/06* (2013.01); *C08J 2300/22* (2013.01)

(58) Field of Classification Search
CPC .......... B29C 70/52–528; B29C 70/523; B29C 70/525; B29C 2793/009; B29C 70/526; B29B 9/14; B29B 11/08; B29B 11/10; B29B 11/16; B29B 7/325; B29B 7/385; B29B 7/603; B29B 9/06; B29B 15/122; C08J 5/04; C08J 2300/22; B29K 2105/06
See application file for complete search history.

(56) References Cited

U.S. PATENT DOCUMENTS

| 3,646,184 | A | * | 2/1972 | Nagao et al. | B01J 2/24 264/144 |
| 4,037,011 | A | * | 7/1977 | Hattori | B29B 9/14 428/299.4 |
| 4,042,658 | A | * | 8/1977 | Collins | B29C 48/32 264/45.5 |
| 4,565,153 | A | * | 1/1986 | Corley | B29B 15/122 118/405 |
| 5,424,388 | A | * | 6/1995 | Chen | B29C 70/521 264/136 |
| 5,747,075 | A | * | 5/1998 | Gauchel | B29C 70/523 156/433 |
| 5,766,357 | A | * | 6/1998 | Packer | B29B 15/122 118/307 |

(Continued)

FOREIGN PATENT DOCUMENTS

| EP | 0 554 950 B1 | 11/1995 |
| EP | 0 737 706 A1 | 10/1996 |

(Continued)

*Primary Examiner* — Jeffrey M Wollschlager
(74) *Attorney, Agent, or Firm* — Robert D. Touslee

(57) ABSTRACT

A fully impregnated fiber-reinforced thermoplastic granule includes a fiber core impregnated with a thermoplastic resin and coated with the resin and subsequently polymerized to form a thermoplastic. The granule is formed in a continuous process including a continuous fiber strand being coated and impregnated with a thermoplastic resin, curing the thermoplastic resin, and cutting the fiber and thermoplastic into granules of a desired length. The continuous process results in a uniform, fully impregnated fiber core in the granule which results in a longer reinforcing fiber for added strength in subsequently produced products formed from the granules.

22 Claims, 5 Drawing Sheets

(56) References Cited

U.S. PATENT DOCUMENTS

| | | | | |
|---|---|---|---|---|
| 5,913,976 A | * | 6/1999 | Patton | G02B 6/02123 |
| | | | | 118/429 |
| 6,143,369 A | * | 11/2000 | Sugawa | B29B 15/122 |
| | | | | 427/407.3 |
| 6,667,372 B1 | * | 12/2003 | Miyake | B29B 7/385 |
| | | | | 526/61 |
| 6,838,030 B2 | * | 1/2005 | Hashimoto | B29B 9/04 |
| | | | | 264/144 |
| 7,597,771 B2 | * | 10/2009 | Spaans | B29C 33/62 |
| | | | | 118/405 |
| 8,597,016 B2 | * | 12/2013 | Brown | B29C 70/523 |
| | | | | 425/505 |
| 8,852,475 B2 | * | 10/2014 | Zhou | B29C 70/526 |
| | | | | 264/136 |
| 10,661,482 B2 | * | 5/2020 | Desbois | B29B 17/0042 |
| 2013/0115412 A1 | * | 5/2013 | Padmanabhan | B29C 70/521 |
| | | | | 428/113 |
| 2016/0318216 A1 | * | 11/2016 | Johnson | B05C 3/125 |
| 2017/0008239 A1 | * | 1/2017 | Zhang | D06M 15/61 |
| 2017/0341270 A1 | * | 11/2017 | Zhang | B29B 9/06 |

FOREIGN PATENT DOCUMENTS

| | | | |
|---|---|---|---|
| EP | 0752306 | * | 1/1997 |
| EP | 3 249 003 A1 | | 11/2017 |
| WO | 1999/065661 A1 | | 12/1999 |
| WO | 2001/002471 A1 | | 1/2001 |
| WO | 2005/090451 A1 | | 9/2005 |
| WO | 2007/050356 A1 | | 5/2007 |

* cited by examiner

MANUFACTURING FIBER-REINFORCED THERMOPLASTIC CONCENTRATES

BACKGROUND

The use of fiber-reinforced composites is growing in popularity with applications in transportation, consumer goods, wind energy, and infrastructure. Some of the many reasons for choosing composites over traditional materials such as metals, wood, or non-reinforced plastics include reduced weight, corrosion resistance, and improved mechanical strength. Within the field of fiber-reinforced polymeric composites, thermoplastics are increasingly being used in place of thermosets as the matrix resin due to better durability, recyclability, thermoformability, improved throughput, lower material cost, and lower manufacturing cost.

The physical properties of thermoplastics are improved by the addition of reinforcing fibers such as glass fibers. The glass fibers provide stiffness, strength, and additional stability. High melt viscosities of thermoplastic polymer resins may cause difficulties in impregnating reinforcing fibers. Conventional techniques for producing thermoplastic composites, such as extrusion compounding, break fibers down to very short lengths, which limits mechanical properties of composite articles. Existing processes to produce thermoplastic composites containing long or continuous fiber strands often result in incomplete resin impregnation of the reinforcing fiber strands and/or poor bonding between thermoplastic matrix and reinforcing fiber strands.

BRIEF SUMMARY

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The embodiments discussed below include a fiber-reinforced thermoplastic material and systems and methods for producing the same. The fiber-reinforced thermoplastic material includes a granule for injection or compression molding. The fiber-reinforced granule may have a continuous fiber strand extending from a distal end to a proximal end of the granule. The continuous fiber strand may lie along a central axis of the granule, surrounded by a thermoplastic material. The continuous fiber strand is fully impregnated with the thermoplastic material. The continuous fiber strand may be visible at the distal and the proximal ends of the granule.

The embodiments described herein provide fully impregnated thermoplastic granules, and specifically systems and methods for making the same. According to one aspect, a thermoplastic granule includes a fiber strand and a thermoplastic material that fully impregnates the fiber strand. The thermoplastic material impregnates the fiber strands such that the granules have a void content of less than 5 percent. The thermoplastic material includes or consists of polymers that are formed by in situ polymerization of monomers or oligomers in which greater than 90 percent of the monomers or oligomers react to form the thermoplastic material. The thermoplastic granule includes a unidirectional fiber strand core impregnated and surrounded by polymerized monomers or oligomers.

In some embodiments, the thermoplastic granule is produced by moving a continuous fiber strand lengthwise through a system. Moisture is removed from the continuous fiber strand at or near a beginning point of the system. A thermoplastic resin is mixed with a catalyst and activator to form a reactive mixture. The reactive mixture is injected into the system to impregnate and coat the continuous fiber strand. Following the injection of the reactive mixture, the fully impregnated fiber strand passes through a curing oven to cure the thermoplastic. The cured fully impregnated continuous fiber strand is then cut into a plurality of granules suitable for injection or compression molding.

In some embodiments, the thermoplastic granule may be produced by a system including a spool, a moisture removal unit, a conveyance device, an injection nozzle, a curing oven, and a cutter. The spool may be positioned at one end of the system and have one or more continuous fiber strands thereon. The conveyance device may be designed to move the one or more continuous fiber strands through the system. The continuous fiber strand is moved through the moisture removal unit which is designed to remove moisture by drying or applying a moisture free gas to remove any lingering moisture on the strands. After the moisture removal unit, the continuous fiber strand passes through an injection unit designed to inject and impregnate the continuous fiber strand with a thermoplastic resin mixed with activators and catalysts. The thermoplastic resins may include monomers having low viscosity to ensure full impregnation of the continuous fiber strands. The injection unit may coat the fiber strands with the thermoplastic resin mix as well as impregnate the strands. The impregnated continuous fiber strands then pass through a reaction oven at a temperature designed to completely cure the thermoplastic resin mixture and polymerize the mixture. The fully impregnated fiber strands having the cured thermoplastic resin are then cut by the cutter into granules. The granules may be sized for use in a compression or injection molding system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. The present invention is described in conjunction with the appended figures.

DETAILED DESCRIPTION OF THE INVENTION

Figure 1:
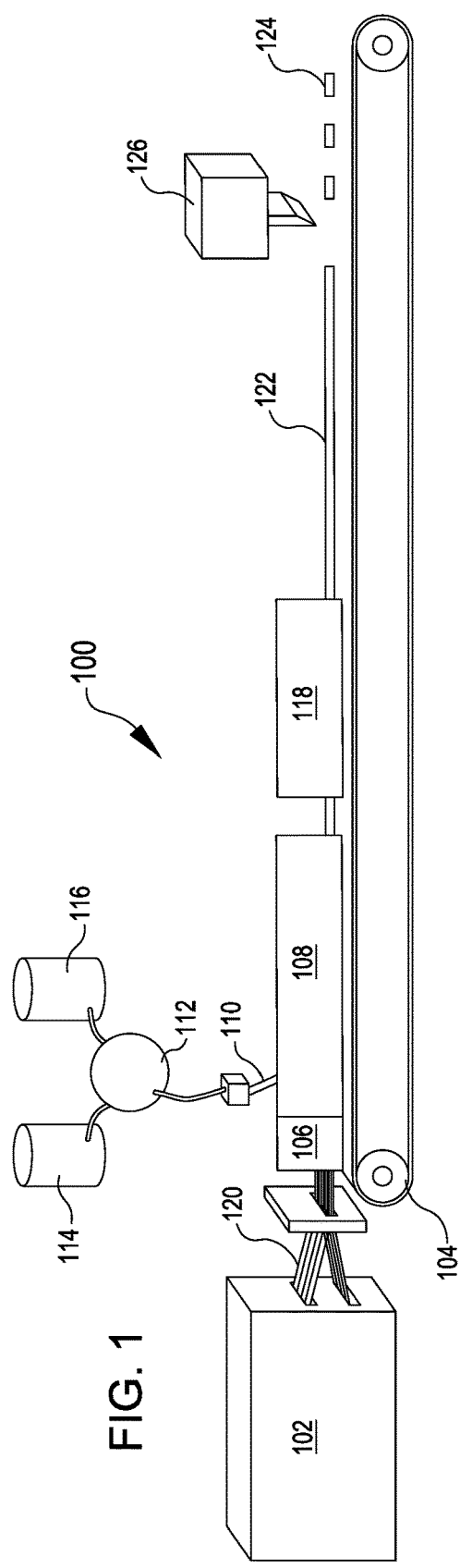
FIG. 1 is a system for producing thermoplastic granules using a conveyor system having individual troughs.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The embodiments described herein relate to fully impregnated fiber-reinforced thermoplastic granules, and specifically systems and methods for making the same. The fully impregnated fiber-reinforced thermoplastic granules are suitable for use in injection molding and compression molding applications, where the thermoplastic products may be reheated and molded into a given shape with reinforcing fiber strands throughout to provide additional strength. The granules are made using fiber strands and reactive resin materials, specifically monomers having a relatively lower viscosity to achieve full impregnation of the fiber strands. For example, in one embodiment the resin material is caprolactam.

The thermoplastic granules are reinforced with a fiber strand made of any synthetic or natural fiber suitable for reinforcing thermoplastics produced by injection molding or compression molding. Exemplary fiber materials include cellulose, cotton, hemp, jute, flax, ramie, sisal, wood, silk, sinew, catgut, wool, rayon, modal, Lyocell, any derivative of petrochemicals, glass, basalt, metallic, carbon, polyamide, polyester, phenol-formaldehyde, polyvinyl alcohol, polyvinyl chloride, polypropylene, polyethylene, acrylic polyesters, aramide, polyurethane, or any other suitable material and various combinations thereof.

The embodiments described herein relate to fiber-reinforced thermoplastic granules, and systems and methods for making the same. The thermoplastic material is formed from thermoplastic resins (also referred to herein as reactive resins), activators, and catalysts. As used herein, the term reactive resin refers to monomers or oligomers that are capable of polymerizing to form thermoplastic polymers. Exemplary reactive resins include lactams such as caprolactam and laurolactam as well as lactones, cyclic butylene terephthalate (CBT), methyl methacrylate, precursors of thermoplastic polyurethane, or mixtures thereof. Other monomers may be used, including those used to form polymers including polyamide 6 (nylon 6), polyamide 12 (nylon 12), polybutylene terephthalate (PBT), cyclic ethylene terephthalate (CET), polyethylene terephthalate (PET), and poly(methyl methacrylate) (PMMA). Additional monomers or suitable materials known to those in the art may be used as well and are intended to be covered by this description. In a specific embodiment, the reactive resin comprises or consists of caprolactam. In some embodiments, mixtures of monomers and/or oligomers may be used, such as mixtures of caprolactam and larolactam, which will copolymerize in the curing oven to form copolymers with tailored properties.

While the embodiments herein describe the use of caprolactam, it is for convenience only. Other reactive resins (including those listed above) are intended to be covered and may be substituted in the description or in the claims. Caprolactam is intended as an illustrative example, and the temperature ranges, residence times, or other processing factors may be adjusted based on the specific reactive resin selected.

As used herein, the activator may be any material that activates and accelerates the polymerization of the monomers or oligomers. Exemplary activators for the anionic polymerization of caprolactam include blocked isocyanates and N-acylcaprolactams. As used herein, the catalyst may be any material that catalyzes the polymerization of monomers or oligomers. Exemplary catalysts for the anionic polymerization of caprolactam include alkaline salt of caprolactam such as sodium caprolactamate.

Caprolactam is a cyclic amide of caproic acid with an empirical formula $(CH_2)_5C(O)NH$, which may be represented by the structural formula:

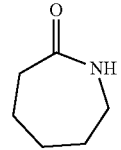

Caprolactam has a low melting point of approximately 68° C. and a melted viscosity (0.004-0.008 Pa·s) that is close to water, making it well suited for wetting and impregnating or penetrating reinforcing fiber strands. Typically, the caprolactam-containing reactive resin composition may be introduced to the plurality of fiber strands as a liquid melt.

Caprolactam-containing reactive resin compositions may include polymerization agents such as a polymerization catalyst or a polymerization activator. Exemplary polymerization catalysts may include a salt of a lactam, and the salt may be an alkali metal salt, an alkali-earth metal salt, and/or a Grignard salt of the caprolactam. For example the polymerization catalyst may be an alkali metal salt of caprolactam, such as sodium caprolactam. In another example, the polymerization catalyst may be a Grignard salt of the caprolactam, such as a magnesium bromide salt of the caprolactam. As used herein, a polymerization activator may be any material that activates the polymerization of monomers or oligomers. Exemplary activators for the anionic polymerization of caprolactam include caprolactam blocked isocyanates and N-acylcaprolactams. Polymerization agents may also be present on the fiber strands, and in some instances a polymerization agent may be present both in the reactive resin composition and on the fiber strands. Incorporating a polymerization agent on the reinforcing fiber strands can render the fiber strands reactive, and reduce or eliminate its presence in the reactive resin composition, which may increase the pot-life of the reactive resin composition prior to being applied to the fiber strands.

The systems and methods described herein are useful for manufacturing fiber-reinforced thermoplastic granules. The thermoplastic polymer in the granules is formed via in-situ polymerization. The systems utilize a continuous process that is able to achieve full impregnation of the thermoplastic material within the fiber strands or rovings, which results in a granule having fiber strands or segments that are substantially longer than those of conventional granules. The continuous process also greatly increases the efficiency of the manufacturing process, which decreases the overall cost of the process. For example, the manufacturing time between coating of the reactive resin (e.g., caprolactam) to the formation of the thermoplastic granules may be less than 20 minutes and commonly less than 10 minutes. In many embodiments, the processing time may be less than 5 minutes or even less than 2 minutes.

The resultant granules include longer fiber strands than conventional granules because the fiber strands extend along a majority of a length of the granule, and in some embodiments the fiber strands extend along an entire length of the granule. In conventional granules, fibers are randomly oriented within the granule and are substantially shorter than the length of the granule. Additionally, the methods and systems described herein typically do not break, damage, or split reinforcing fiber strands during the granule forming process, which commonly occurs in conventional methods. The result is that products that are formed from the granules (typically via injection molding or compression molding) exhibit greater strength than similar products that are produced with conventional granules.

The systems and methods described herein are also able to achieve full and complete impregnation of the fiber strands with the thermoplastic polymer. The low viscosity of the reactive resin material allows the resin to easily penetrate within the fiber strands and saturate the individual fiber strands. In some embodiments, the fully impregnated fiber strands may be cut into individual pieces or granules having any desired length. In other embodiments, several parallel fiber strands may be impregnated next to each other and cut into desired widths and lengths.

The embodiments described herein provide a process and apparatus that utilizes mixing of reactive resin components, followed by application of the reactive resin components to a continuous fiber strand or roving. The reactive resin components are then cured in an oven to form a fully impregnated fiber-reinforced rod which is then cut into individual granules. In a specific embodiment, caprolactam is employed as the reactive resins and is polymerized to form polyamide-6 in the finished product. In other embodiments, other monomers, such as laurolactam may be used which, when polymerized, result in polyamide-12, poly(methyl methacrylate), or polybutylene terephthalate polymers. Other monomers or polymers known to those will skill in the art are intended to be covered and will be understood by those with skill in the art with reference to the present application. In some embodiments, the system is designed to isolate the reactive resin components from atmospheric moisture in order to achieve a high conversion of the monomers or oligomers to the thermoplastic polymer. Specifically, the system may be designed to ensure a substantially moisture-free environment in the vicinity of the fiber strands and the injection and/or impregnation zone. The reactive components may be isolated from atmospheric moisture in order to achieve a high conversion of the monomers or oligomers to the thermoplastic polymer. Isolating the reactive components from atmospheric moisture is particular important when the reactive components are highly sensitive to moisture, such as caprolactam. Isolation of the reactive components may be achieved, in part, by controlling the environment in the vicinity of the production process and/or by removing residual moisture from the fiber strands and/or any of the processing systems.

In some embodiments, the system may be designed to impregnate and/or coat rovings of multiple fiber strands. The term roving as used herein refers to a bundle of fiber strands that are positioned adjacent one another to form a rope, thread, or cord like component. A common type of fiber strand that is used in rovings is glass fibers, although various other fiber types could be used such as carbon fibers, basalt fibers, metal fibers, ceramic fiber, natural fibers, synthetic organic fibers such as aramid fibers, and other inorganic fibers. For convenience in describing the various embodiments herein, the description will refer to the fibers generally as fiber strands, although it should be realized that this disclosure is intended to cover rovings or other similar fiber strands.

The fiber strands used herein may be treated with a sizing composition including coupling agent(s) that promote bonding between the fiber strands and polymer resin. For example, the fiber strands may be sized with one or more coupling agents that covalently bond the thermoplastic resin to the fiber strands. Exemplary coupling agents may include coupling-activator compounds having a silicon-containing moiety and an activator moiety. Specific examples of coupling-activator compounds include 2-oxo-N-(3-(triethoxysilyl)propyl)azepane-1-carboxamide. Exemplary coupling agents may also include blocked isocyanate coupling compounds having a silicon-containing moiety and a blocked isocyanate moiety. Exemplary coupling agents may also include coupling compounds having a functional group that may react with the reactive resin to form covalent bond. Specific examples of the coupling compounds having a functional group include silane coupling agents having amino, epoxy, or ureido functional groups.

The fiber strands may be moved from a spool and through several system components. The system may include a moisture removal unit that is designed to remove moisture from the fiber strands and/or other system components. The moisture removal unit may include a nitrogen gas purge that is designed to purge moisture laden gas from the system. In other embodiments, the moisture removal unit may include an oven or heating unit that is designed to dry the components of the system and/or the fiber strands. The use of the moisture removal unit results in a moisture free or substantially moisture free environment, which may be limited to the impregnation unit or may include other system components, such as the holding tanks and/or other system components.

The term "substantially moisture-free" recognizes that some level or amount of moisture or humidity may be present in the air. However, as used herein the term implies that any humidity or moisture present in the air is negligible, minor, insignificant, or otherwise inconsequential. For example, a "substantially moisture-free" environment may be created by employing a moisture purge mechanism that is operable to maintain the relatively humidity in the environment to be less than 200 ppm within the operating temperature range. As a second example, a "substantially moisture-free" environment may be created by employing a moisture purge mechanism that is operable to maintain the relatively humidity in the environment to be below 1% under the temperature range of 5-35° C.

The fiber strands may pass through an injection or impregnation unit after the fiber strands are subjected to the moisture removal unit. The impregnation unit may comprise one or more channels or passages through which one or more of the fiber strands pass and into which the thermoplastic resin, and optionally additives, are injected or introduced to impregnate and coat the fiber strands. The impregnation unit includes an application mechanism, such as an injection nozzle for applying the reactive resin to the fiber strands. The reactive resin may be applied to the fiber strands in combination with the catalysts and/or additives as desired. The reactive resin may be fed to the application mechanism from one or more holding tanks and/or a mixing unit. The holding tanks and mixing unit may contain monomers or oligomers, catalysts, additives, or any combination thereof.

In some embodiments, the system includes two vessels or holding tanks. The holding tanks may be heated and purged with nitrogen to ensure the removal of any moisture, which could otherwise reduce the reactivity of the raw materials and consequently reduce the conversion of the resins to a polymer. One of the holding tanks may contain a mixture of a resin and a catalyst while the other holding tank contains a mixture of the resin and an activator. In a specific embodiment, one holding tank includes caprolactam and a catalyst, such as sodium caprolactamate or any other catalyst while the other holding tank includes caprolactam and an activator, such as N, N'-hexane-1,6-diylbis(hexahydro-2-oxo-1H-azepine-1-carboxamide) or any other activator. The holding tanks are heated to a temperature that allows the reactants to melt. In some embodiments, the temperature may be between about 70 and 120 degrees Celsius. The molten reactants (e.g., the resin and activator or catalyst) have a very low viscosity, for example, lower than 10 mPa·s, measured using ISO 3104:1999.

The reactants from the two holding tanks are metered into a static mixer or mixing head that ensures that a correct ratio of the resin, activator, and catalyst is achieved. In one embodiment, the mixtures from the two holding tanks may be provided to the static mixer in a 1/1 ratio. For example, the resin and activator mixture from a first tank may be provided in an equal volume and/or material flow to the resin and catalyst mixture. The mixtures from the two holding tanks are thoroughly mixed in the static mixer into a substantially homogenous mixture.

The fiber strands are conveyed from the impregnation unit after being fully impregnated by the thermoplastic resin mixture. The fully impregnated fiber strands are then cured in a curing oven. The curing oven may operate at a temperature in the range of 70-250 degrees Celsius. In a specific embodiment, the curing oven may operate in a temperature range of between 70 and 120 degrees Celsius, which is ideal for polymerizing caprolactam. The temperature of the curing oven is maintained at a selected polymerization temperature and the impregnated fiber strands are passed through the oven for a length of time that is sufficient to polymerize the monomers or oligomers.

After leaving the oven, the fully impregnated fiber strands are passed to a cutter, which cuts the fiber strands into individual granules. The granules may be of any desired or required length. In some embodiments, the granules may be cut into lengths of between 1 mm and 100 mm. For some injection molding applications, the granules may be cut into lengths in a range of 1 mm to 30 mm, preferably in a range of 2 mm to 12 mm. For some compression molding applications, the granules may be cut into lengths in a range of 1 mm to 100 mm but may, in some applications, be cut into lengths in a range of 5 mm to 80 mm. In some further applications, the granules may be cut into lengths in a range of 5 mm to 51 mm. The granules may be cut in lengths ranging up to 4 inches (101.6 mm). The cutting machine may include a guillotine cutter, a rotary cutter, or any other cutting device that is able to cut the fully impregnated fiber strands into granules.

Having referred to various features generally, additional aspects and features of the thermoplastic granules and of the systems and methods for producing the thermoplastic granules will be realized in relation to the description of the various figures, which is provided herein below.

Referring to FIG. 1, illustrated is a system 100 that may be used to produce a fully impregnated fiber-reinforced thermoplastic granule. The system of FIG. 1 is capable of producing the granules in a continuous process, in which a fiber strand 120 is continually or constantly in movement through the system 100. Stated differently, the term continuous process means that the process is not interrupted or paused in forming the thermoplastic granule. Rather, each step in the process is continually or constantly being performed. For example, the fiber strand is continually moved from a spool or rack of spools 102, dried, coated and impregnated with reactive resin, cured in an oven, and cut into a final product. In contrast, conventional systems typically are made in a batch process, in which one or more steps or operations are performed before the entire batch is moved to another step or operation in the process. In contrast, in the system herein, each step or operation occurs in a continuous or constant manner and the fiber strands are moved continuously through the system.

The rack of spools 102 typically contains a plurality of spools that may include similar or different fiber strands 120 from an adjacent spool. Each fiber strand is unwound from the respective spool and is pulled or moved through the system 100 in parallel to an adjacent fiber strand, which increases the production and output of the system. The resulting granules may be relatively homogenous or may include a mixture of types of fiber strands and/or thermoplastic materials as desired.

The fiber strands 120 are moved through the system 100 by a conveyor system 104. The conveyor system may include a single conveyor belt 104 that is configured to pull or unwind the fiber strands 120 from the rack of spools 102. In other embodiments, the conveyor system may include more than one conveyor belt 104. For example, the system 100 may include a lower conveyor belt 104 and an upper conveyor belt (not shown), which sandwich the fiber strands 120 between the conveyor belts and pull the fiber strands 120 through the system 100. The conveyor belt 104 may also comprise several conveyor belts arranged in series. In some embodiments, the conveyor belt 104 may be a conveyance system which does not include a belt, but that is designed to move the fiber strands 120 through the system 100 while providing a substrate that is able to contain the thermoplastic resin during the impregnation, coating, and/or the curing processes.

The system 100 also includes a drying mechanism 106 that is positioned atop the conveyor belt 104 and that is configured to remove residual moisture from the fiber strands 120 as the fiber strands 120 are moved past the drying mechanism 106. For example, an infrared heater 106 may be used to raise the temperature of the fiber strands 120 and thereby remove any residual moisture. In a specific embodiment, the infrared heater 106 may be positioned atop or over the fiber strands 120 to remove residual moisture. In some embodiments, a second heater (not shown) may be positioned on an opposite side (e.g., bottom side) of the fiber strands 120 to further aid in removal of residual moisture. Alternatively, a pre-drying oven (not shown) may be used in place of or in addition to the infrared heater 106. In some embodiments, the drying mechanism 106 may include or comprise a moisture-free gas introduction device. For example, the drying mechanism 106 may introduce nitrogen gas to the system 100 to create a moisture free or substantially moisture free environment.

The system 100 may include two holding tanks or vessels 114 and 116. The holding tanks 114 and 116 may be heated and/or purged with nitrogen to remove moisture that would otherwise reduce the reactivity of the raw materials. One of the holding tanks 114 may contain a mixture of a resin and a catalyst. In a specific embodiment, one holding tank 114 may include caprolactam and a catalyst, such as sodium caprolactamate or any other compatible catalyst, which the other holding tank 116 includes caprolactam and an activator, such as N,N'-hexane-1,6-diylbis(hexahydro-2-oxo-1H-azepine-1-carboxamide) or any other suitable activator. The holding tanks 114 and 116 are heated to a temperature that allows the contents to remain in a liquid state. In some embodiments, the temperature may be between about 70 to 120 degrees Celsius. The molten reactants within the holding tanks 114 and 116 have a very low viscosity, such as less than 10 centipoises (cP).

The reactants from the holding tanks 114 and 116 are metered or measured into a mixing unit 112 that ensure a correct ratio of resin, activator, and catalyst is achieved. In one embodiment, the mixtures from the holding tanks 114 and 116 may be provided in a 1/1 ratio. The mixtures from the holding tanks 114 and 116 are mixed until homogenous in the mixing unit 112. The mixing unit 112 may be a static mixer or may include active stirring or mixing components.

In some embodiments, the activator is included on the surface of the fiber strands 120. The fiber strands 120 may consist of glass fiber material that has been pre-treated with a sizing composition. For example, the sizing composition may include a coupling activator that covalently bonds the polymerization activator moiety to the glass fiber. In such instances, the bonding between the thermoplastic polymer and the fiber strands may be significantly strengthened or enhanced. When the fiber strands 120 include the activator, only a single holding tank (e.g., holding tank 114) containing the resin and catalyst may be used, or a reduced amount of the activator may be mixed with the resin in the second holding tank (e.g., holding tank 116). In some embodiments, each holding tank may include a different resin material. For example, a first holding tank 114 may include caprolactam while the second holding tank 116 includes laurolactam. In such instances, a combination of two or more types of reactive monomers and/or oligomers may be applied to the fiber strands 120.

Figure 3:
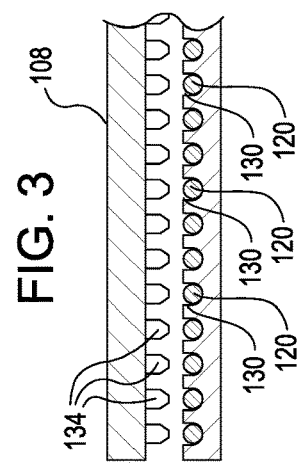
FIG. 3 is a detail view of the conveyor having fiber strands in channels and distribution nozzles positioned above each channel.
Figure 2:
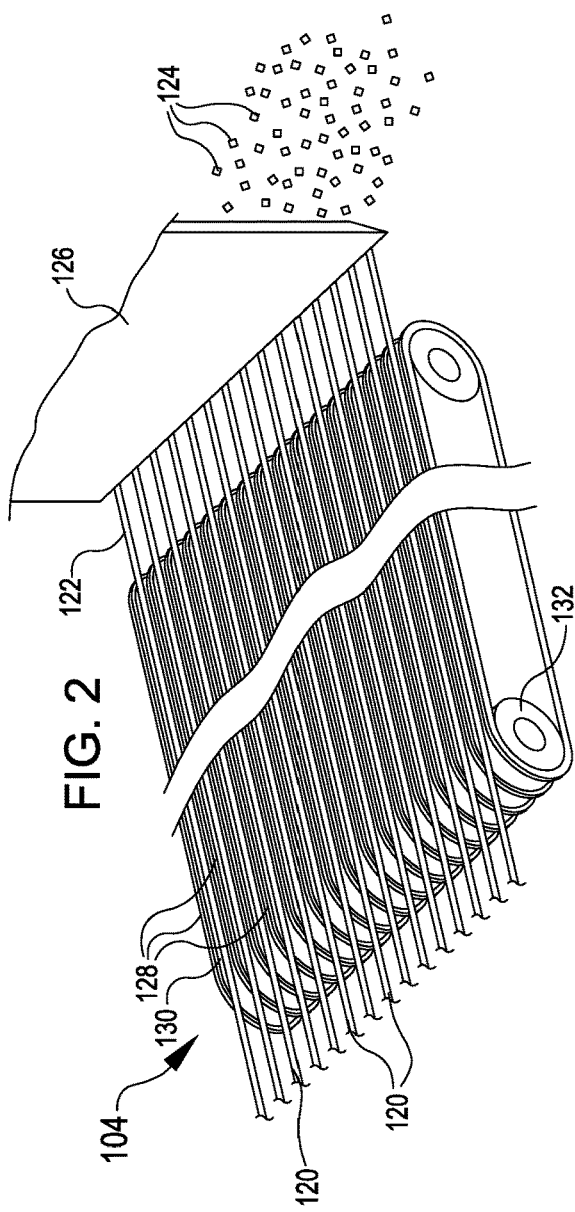
FIG. 2 is a detail view of an embodiment of a conveyor with a plurality of troughs for use in a system for producing thermoplastic granules.

The mixed reactants are injected into an impregnation die 108 using an injection nozzle 110. The injection nozzle 110 may include distribution channels (not shown) and distribution nozzles (as shown in FIG. 3) to inject mixed reactants into one or more passages of the impregnation die 108. The fiber strands 120 pass through the passages of the impregnation die 108 and come into contact with the reactive resin. The impregnation die 108 includes a conveyor belt 104 having one or more channels running along the length of the conveyor 104 belt as shown in FIG. 2 and an upper unit which contains distribution passages and distribution nozzles for the reactive resin. The fiber strands 120 pass through the enclosed passages and have the reactive resin introduced to impregnate and coat the fiber strands 120.

At or near the exit of the impregnation die 108 is a curing oven 118. The closer the entrance to the curing oven 118 is positioned to the impregnation die 108, the less exposure the reactive resin may have to atmospheric or ambient moisture, which may be desired for the reasons previously described. The curing oven 118 is maintained at a temperature that ensures complete polymerization of the resin to a thermoplastic polymer. Stated differently, the curing oven 118 is maintained at a polymerization temperature at which the monomers or oligomers start to polymerize. For a reactive resin composition that includes caprolactam, the polymerization temperature may be about 120° C. or more (e.g., about 120° C. to about 220°). An upper limit for the temperature of the curing oven 118 may be the melting temperature of the resulting polymer. For example, a reactive resin composition that includes caprolactam may have a upper limit of a polymerization temperature that is the melting temperature of the PA-6 polymer (i.e., ~220° C.). The impregnated fiber strands 120 may be in the curing oven 118 for a time that is sufficient to ensure complete polymerization of the resin material. For example, for a reactive resin composition that includes caprolactam, the exposure time for the fiber strands 120 in the curing oven 118 may be about 2 minutes to ensure complete polymerization of the caprolactam. In some embodiments, the speed of the conveyor belt 104 and/or the speed of the fiber strands 120 may be adjusted to increase or decrease the residence time in the curing oven 118. In some embodiments, the curing time in the oven may be 5 minutes or less, 3 minutes or less, or 2 minutes or less.

Thermoplastic ropes 122 including the cured impregnated fiber strands exit the curing oven and are moved continuously towards a cutter 126. The cutter 126 is designed to cut the thermoplastic ropes 122 into granules 124 of a desired length. The cutter 126 may cut all or any one of the thermoplastic ropes 122 at the same time. In some embodiments, the granules 124 may be cut into lengths of between 1 and 100 mm, between 10 and 100 mm, or between 1 to 30 mm.

As shown in FIG. 2, the conveyor belt 104 defines or comprises a plurality of channels 130, with walls or edges 128 between adjacent channels that form barriers and help define the size and shape of the channels 130. The conveyor belt 104 includes at least two rollers, or other drive members, that direct and align the conveyor belt 104 and that drive the conveyor belt 104. The fiber strands 120 are moved through the system 100 at the same rate of movement as the conveyor belt 104. At an entry of the conveyor belt 104, the fiber strands 120 are in each of the channels 130. After passing through the impregnation die 108 and curing oven 118, thermoplastic ropes 122 are produced which have the fiber strands 120 impregnated and coated with the reactive resin and cured. At the exit end of the conveyor belt 104, the thermoplastic ropes 122 are cut into granules by the cutter 126.

Each of the channels 130 may have a semi-circular profile or cross section with an open top end. At the edges of the conveyor belt 104, the walls may be straight side walls. The radius of the semicircular profile or cross section may be in a range of 1 mm to 3 mm, and more commonly within a range of 1.5 mm to 2.5 mm. In some embodiments, the channels 130 may have rectangular or other shaped profiles having similar dimensions to those described above. The channels 130 may be spaced between 1 mm and 5 mm apart. Typically, the channels 130 will be as tightly packed as possible, with a wall between two adjacent channels shared in common between the two channels.

During production of the granules 124, the channels 130 will be in contact with resin material, some of which may be unused or not connected to the fiber strands 120. If left uncleaned, this residual resin material may contaminate and/or otherwise interfere with granule production. Accordingly, a cleaning step or process (not shown) may be included to clear unused or residual resin and return the channels 130 to a clean state ready for introduction of fiber strands 120 and resin material. The cleaning process may include scraping, with a rigid member, the unused resin material out of the channels 130. In some embodiments the cleaning may also include thermal cleaning such as burning or heating and/or chemical cleaning using chemical cleaners to remove residual resin material. Cleaning methods and techniques known to those skilled in the art may be implemented with the specific purpose of cleaning out the channels 130 to ensure the channels 130 are not plugged, contaminated, or otherwise contain foreign material. In some embodiments, the conveyor belt 104, including the channels 130, may include a non-stick or anti-adhesive surface or coating to prevent or reduce resin adhesion and residual resin buildup.

The impregnation die 108 may distribute reactive resin into each of the channels 130 which also have fiber strands 120 positioned therein. The reactive resin is in contact with the fiber strands 120 and due to the low viscosity of the reactive resin, fully impregnates the fiber strands 120. The volume or amount of resin distributed within each of the channels 130 is determined or defined by the size of the fiber strands 120 and the speed of the conveyor belt 104. The resin distributed within the channels 130 is typically proportional to the speed of the conveyor belt 104 and consequently, the speed of production. The impregnation die 108 may distribute enough resin to fill the channels 130 at the production speed without overfilling the channels 130.

A perspective view of the conveyor belt 104 and distribution nozzles is shown in FIG. 3. Each channel 130 has a round or semi-circular profile with an open top end that allows the reactive resin to be injected within each channel 130 from one of the distribution nozzles 134. Specifically, a distribution nozzle 134 is positioned above each channel 130 and is configured to apply or inject the reactive resin into the channel 130 to impregnate and coat the fiber strands 120. The channels 130 are shown as having round or semi-circular cross-sectional shapes, although cross-sectional shapes may be used for the channels 130 as desired, such as rectangular, oval, semi-oval, v-shaped, and the like. The fiber strands 120 rest in each of the channels 130 and are moved along the conveyor belt 104 through the system 100. The fiber strands 120 are typically positioned in the channels 130 so that a top surface of the fibers strands 120 is below a top surface of the respective channel 130. In this manner, the reactive resin fully surrounds and coats the fiber strand within the channel.

As the fiber strands 120 are moved through the system 100, the distribution nozzles 134 inject the reactive resin into each channel 130. The reactive resin is injected within the channels at a rate that is sufficient to ensure that the fibers strands are fully covered by the reactive resin while ensuring that the reactive resin does not overflow from the channels 130, which could interfere with operation of the system 100 and/or clog the channels 130. The dispersal rate may be controlled through the distribution nozzles 134 to prevent over or under filling the channels 130.

The dispersal rate through the distribution nozzles 134 and/or the speed of the conveyor belt 104 may be set or adjusted manually to ensure proper filling of the channels 130. The dispersal rate and/or the speed conveyor belt 104 can also be controlled automatically by a system including controllers and level sensors such as laser sensors positioned to measure a level of the reactive resin within the channel 130. Other methods may also be employed to control the level of reactive resin within the channel 130.

Figure 4:
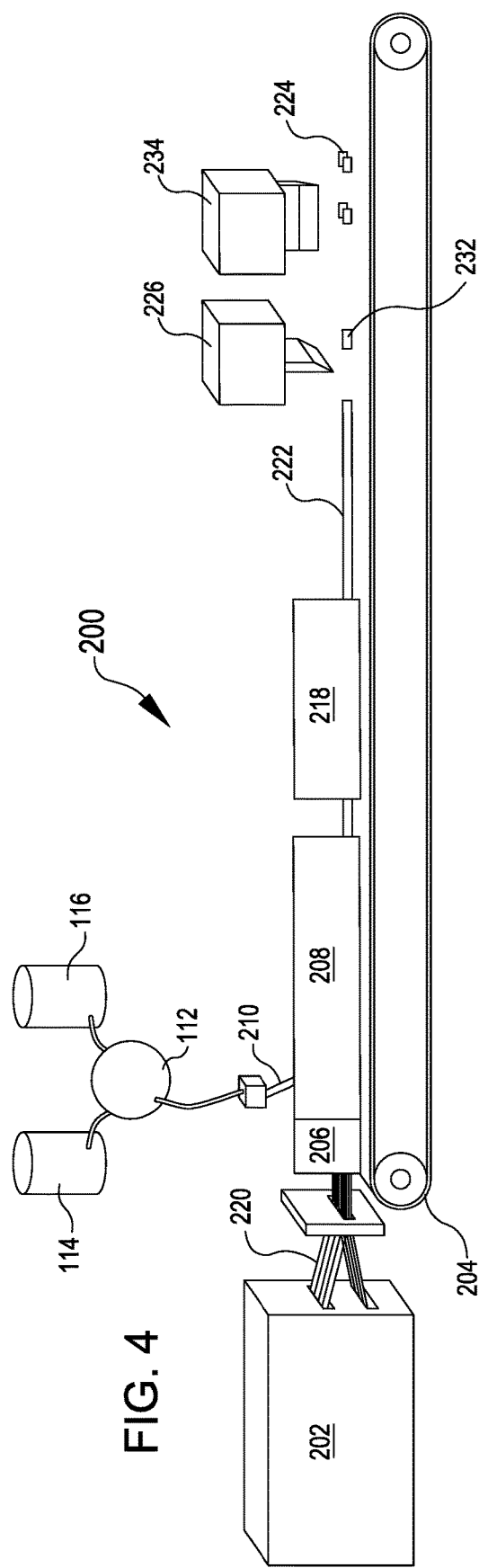
FIG. 4 is a system for producing thermoplastic granules using a conveyor system and multiple perpendicular cutters.

FIG. 4 shows another embodiment of a system 200 for producing granules 224 using a continuous process and continuous fiber strands 220. The fiber strands 220 are pulled or otherwise moved from a source 202 through the system 200. The system 200 includes a drying machine 206, holding tanks 214 and 216, mixing unit 212, injection nozzle 210, and curing oven 218 similar to those described above with respect to FIG. 1. The conveyor belt 204 of the system 200 may be designed to pull or move the fiber strands 220 through the system 200 or may be designed to match the speed of the fiber strands 220 as they move through the system 200. The conveyor belt 204 is designed to have a plurality of fiber strands 220 lying across an upper surface of the conveyor belt 204. The plurality of fiber stands 220 may be spaced between 1 mm and 5 mm apart. Specifically, the fiber strands 220 are fed onto the conveyor belt 204 from the spool so that the fiber strands 220 are lying parallel to one another atop the conveyor belt 204. The impregnation unit 208 applies the reactive resin onto the conveyor belt 204 where the reactive resin comes into contact with and saturates the plurality of fiber strands 220. The reactive resin forms a sheet or layer of reactive material that is approximately the same width as a width of the conveyor belt 204. The fiber strands 220 are disposed within the reactive material in a parallel configuration relative to one another.

The curing oven 218 polymerizes the reactive resin to form a thermoplastic sheet 222 with the parallel oriented fiber strands 220 disposed within the thermoplastic sheet 222. The thermoplastic sheet 222 may have a width that is substantially the same width as the conveyor belt 204. The cured sheet 222 is moved to a first cutter 226, which is oriented perpendicular to the fiber strands 220 and that is configured to cut the thermoplastic sheet 222 into thermoplastic segments or strips 232 having a width that is substantially the same as the width of the conveyor belt 204 but having a length at or near a desired final length of the granules 224. A second cutter 234, and more commonly a plurality of second cutters, is positioned downstream of the first cutter 226 and is typically oriented perpendicular to a plane of the first cutter 226. The second cutter 234 cuts the thermoplastic segments 232 parallel to the direction of the fiber strands 220 and into granules 234. The second cutter 234 typically cuts the thermoplastic segments 232 so that each of the fiber strands 220 is separated from an adjacent fiber strand 220. In such embodiments, the resulting granule 224 includes or contains only one fiber strand 220. In other embodiments, the second cutter 234 may cut the thermoplastic segment 232 so that the resulting granule has 2 or more fiber strands 220.

In some embodiments, the orientations of the first and second cutters 226 and 234 may be switched, such that the first cutter cuts parallel to the fiber strands 220 and the second cutter 234 cuts perpendicular to the fiber strands 220. In some other embodiments, the cutting processes may be carried out by a single cutting machine or more than two cutting machines. For example, a single cutting machine may include a guillotine-style cutter having multiple knives positioned and spaced to cut the cured sheet 222 into granules 224 directly, without an intermediate step.

Figure 5:
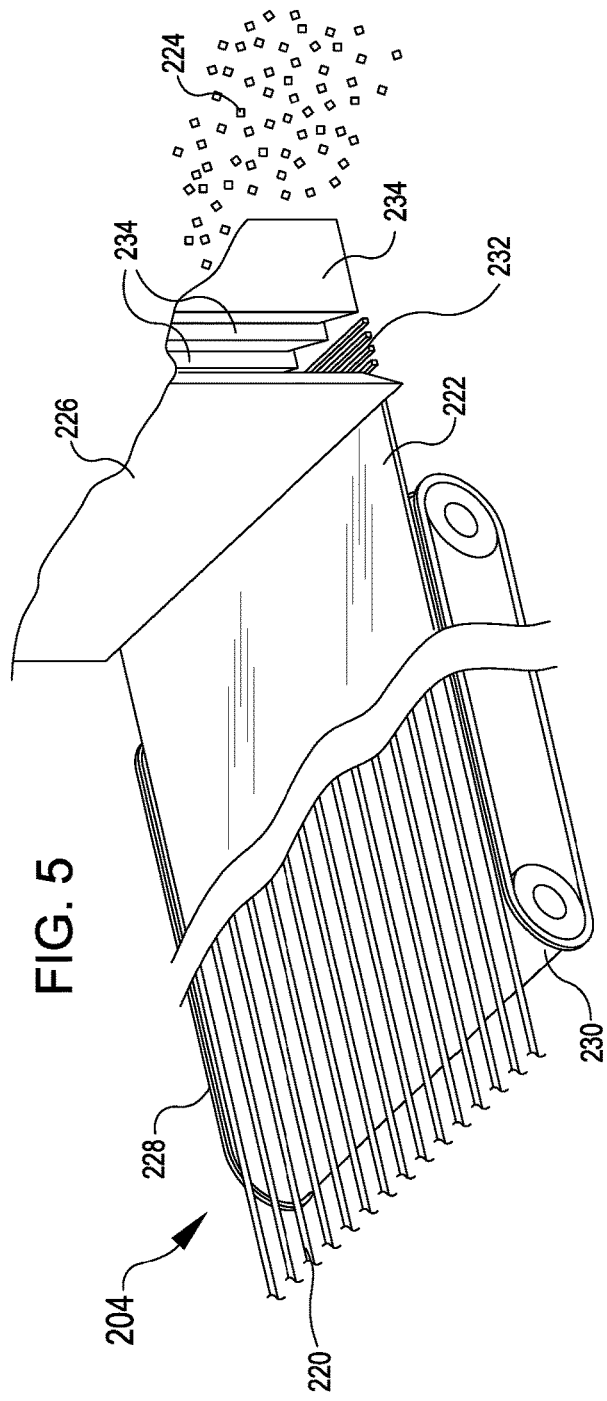
FIG. 5 is a detail view of an embodiment of a conveyor for use in a system for producing thermoplastic granules having multiple perpendicular cutters.

FIG. 5 shows an example embodiment of a conveyor belt 204 for use in the system 200 described above. The conveyor belt 204 includes a flat surface 230 on which the fiber strands 220 are positioned or supported. At the lateral edges of the conveyor belt 204 are raised portions, such as walls or ridges 228. The ridges 228 run the full length of the conveyor belt 204. The ridges 228 serve to keep the reactive resin in contact with the fiber strands 220 and keep the reactive resin from flowing off the conveyor belt 204 after being distributed onto the conveyor belt 204 from the impregnation unit. The heights of the ridges may be in a range of between 1 mm and 10 mm, but are typically in a range of between 3 mm and 7 mm. After the reactive resins are distributed onto the conveyor 204 and the reactive resin is polymerized, the fiber strands 220 are disposed within the thermoplastic sheet 222. The thermoplastic sheet 222 is then cut into strips 232 by the first cutter 226. The second cutter 234 then cuts the strips 232 into granules 224.

Figure 6:
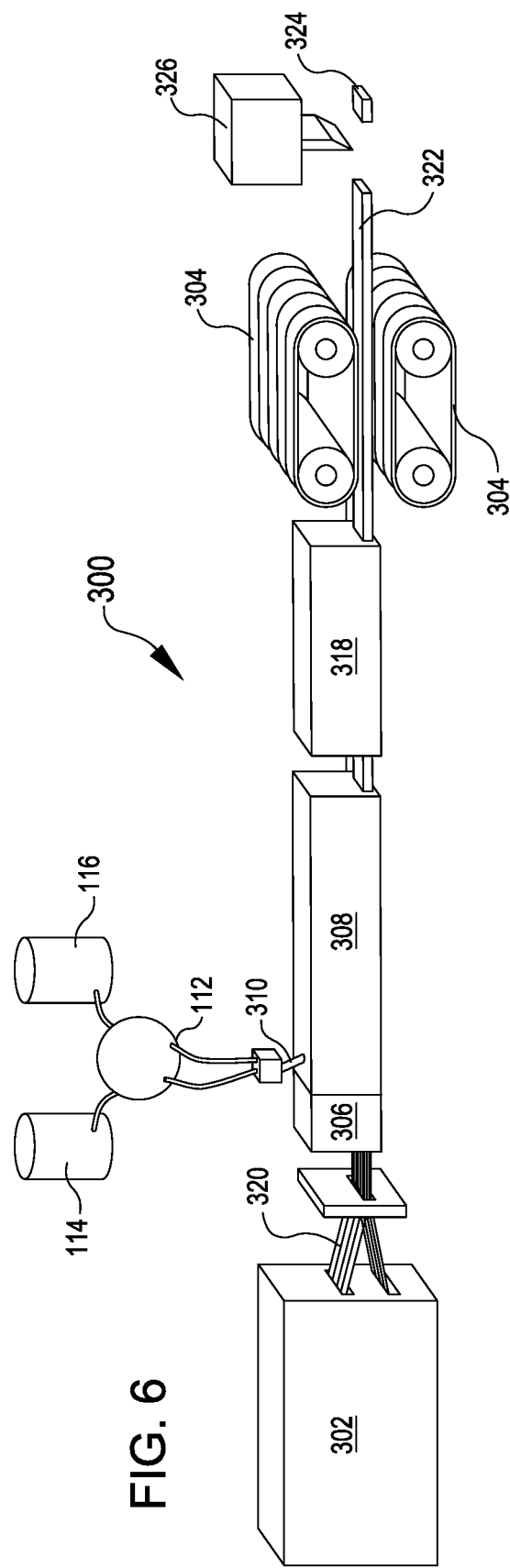
FIG. 6 is a pultrusion system for producing thermoplastic granules.

In some embodiments, the resin impregnation may be performed by a pultrusion-type machine or system 300 as shown in FIG. 6. The system 300 includes two conveyors 304 that are configured to pull or move fiber strands 320 through the system 300. The fiber strands 320 are continuous and begin at a source or spool 302. The system 300 includes a drying machine 306, holding tanks 114 and 116, mixing unit 112, curing oven 318, and cutter 326 as described with reference to the other embodiments described herein. The fiber strands 320 are pulled through the drying machine 306 and into the impregnation die 308. The impregnation die 308 includes an injection nozzle 336 for injecting and distributing the reactive resin into passages of the impregnation die 308 through which the fiber strands 320 pass. The reactive resin comes into contact with the fiber strands 320 within the passages of the impregnation die 308 and the fiber strands 320 are coated and impregnated by the reactive resin. After the fiber strands 320 are impregnated with the reactive resin, the fiber strands 320 are passed through the curing oven 318 to polymerize the monomers or oligomers and thereby form the thermoplastic material. The fiber strands 320 are then moved to the cutter 326 where they are cut into individual granules 324.

Figure 7:
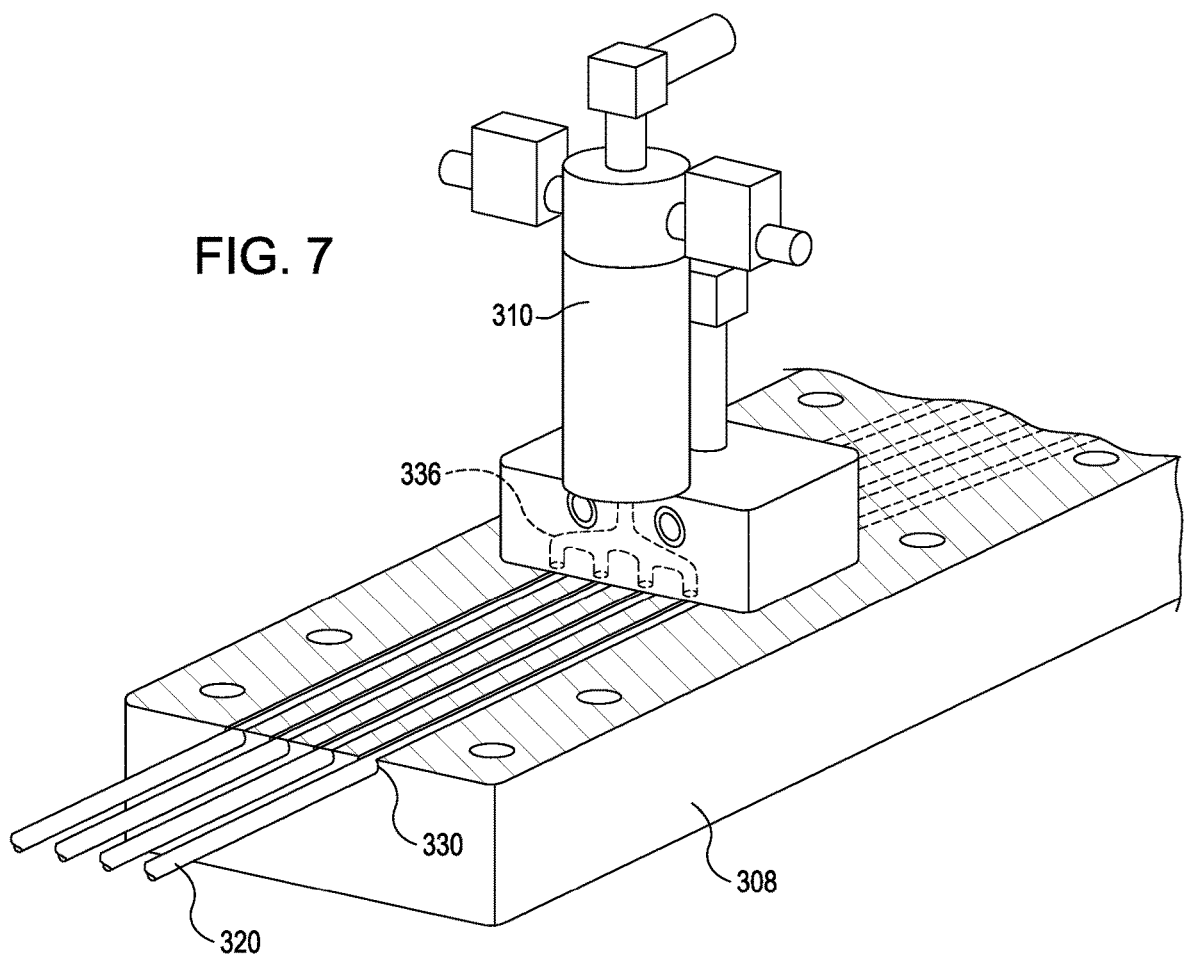
FIG. 7 is a distribution and injection nozzle for injecting thermoplastic resin and additives.

The impregnation die 308 of the system 300 from FIG. 6 is shown in FIG. 7. The fiber strands 320 are pulled or moved through the passages 330 in the impregnation die 308. The passages 330 are sized to allow the fiber strands 320 to pass through the die 308. The passages may be slightly oversized to allow the reactive resin to coat the outside of the fiber strand 320 with a reactive resin shell. The passages 330 typically have a circular cross section, although in some embodiments the passages 330 may have non-circular cross sections, such as an oval, square, hexagonal, or other such shape. The impregnation die 308 is shown with an upper portion of the die 308 removed. The upper portion of the die 308 encloses the passages 330 such that they form channels or tunnels through the die 308. In some embodiments, the injection unit comprises an upper half and a lower half that separate at or near a center of the passages 330.

An injection nozzle 336 of the upper impregnation die is shown including a distribution manifold having a plurality of ports that are each configured to deliver or inject reactive resin into a respective passages 330 of the die 308 so that each passage 330 through which a fiber strand 320 is fed receives reactive resin that is able to coat and fully impregnate the fiber strand 320. A mixing unit 310 is shown in close proximity to and in fluid communication with the injection nozzle 336. The mixing unit 310 may be in close proximity to the holding tanks (see FIG. 5) and injection nozzle 336 to reduce heat losses from the reactive resin and thereby minimize or prevent the reactive resin from solidifying in the mixing unit 310 or injection nozzle 336.

Figure 8:
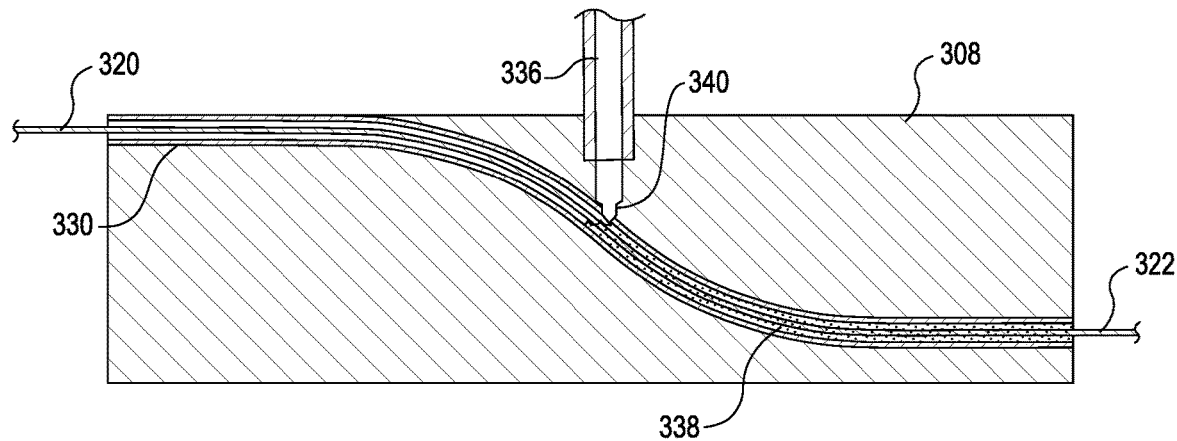
FIG. 8 is an injection zone of a system for producing thermoplastic granules using a downward curving tube.

FIG. 8 shows an exemplary arrangement of a passage 330 of the die 308 of FIG. 6. While FIG. 8 only shows a single passage 330, it should be realized that each of the passages 330 of the die 308 are similarly arranged. The passage 330 arrangement illustrated in FIG. 8 minimizes or prevents backflow of the reactive resin within the die 308. Minimizing or preventing backflow of the resin within the die 308 is especially important when low viscosity resin materials are used, such as those described herein. For example, the low viscosity of the reactive resins makes it increasingly difficult to control these materials within the die 308 and may cause the reactive resins to flow or migrate toward an entrance of the die 308 and passage 330 (i.e., backflow). This back or counter flow of the reactive resin may be particularly relevant as the pressure within the passage 330 increases toward a distal or exit end of the passage 330. The backflow of the reactive resin may cause the resin to flow or spill out of the entrance of the passage 330 and die 308 in extreme instances. In other instances, the reactive resin may stagnate or pool within the passage 330 in a location that is proximal to or before the injection die. In such instances, the reactive resin may begin to polymerize within the passage 330, which may cause clogging or fouling of the passage 330 and the die 308.

To minimize or prevent this problem, the passage 330 is shaped so that the reactive resin is forced to flow toward the distal or exit end of the passage 330 and die 308. Specifically, the passage 330 has a downward slope, arc, or other curvature within the die 308 that prevents or greatly minimizes backflow of the reactive resin out an entrance of the passage 330. In the illustrated embodiment, the passage 330 has an S-shaped configuration that curves downward rapidly near the distribution nozzle 340 and that levels or flattens near an entrance and an exit of the passage 330. The configuration of the passage 330 result in a distal portion of the passage 330 being vertically offset and lower than a proximal portion of the passage 330. The distribution nozzle 336 may be disposed near a central portion of the passage's slope or may be positioned elsewhere in relation to the slope as desired. The injection nozzle 336 distributes the reactive resin 338 to each of the passages 320 through a distribution manifold. The reactive resin is typically distributed to each passage 330 equally, although the amount of resin delivered to each passage 320 may be varied as desired. In other embodiments, the passages 320 may have a relatively constant slope or incline within the impregnation die 308. The slope or incline may be configured to force the reactive resin to flow toward the distal end of the impregnation die 308, which ensures that the reactive resin flows in a single direction, thereby preventing backflow within the impregnation die 308. For example, a grade of the constant slope or incline my force the reactive resin to flow toward the distal end of the impregnation die 308.

The reactive resin is typically applied or injected into the passage at or near the sloping section of the passage 330. The downward slope of the passage 330 and the injection of the reactive resin at or near the downward slope forces the reactive resin to flow toward the distal or exit end of the passage 330 and die. In particular, gravity pulls the reactive resin toward the distal or exit end of the die. Since the reactive resin has a very low viscosity (typically lower than 10 cP), the force of gravity is typically much greater than any fluid pressure forces that may occur within the passage 330, especially if the passage 330 is maintained in a clean condition. The insertion and pulling of the fiber strands 320 through the passage 330 also imparts frictional forces on the reactive resin that encourages the resin to flow through the passage 330 toward the distal or exit end of the passage 330 and die 308. Any pooling of the reactive resin that may occur within the passage 330 would be limited to near the vicinity of the injection die 336 and more typically would occur distally of the injection die 336. A possible pooling or collection of the reactive resin within the passage 330 is illustrated by reference numeral 338, which illustrates the reactive resin in contact with the fiber strand 320 so that the reactive resin coats and impregnates the fiber strand 320. FIG. 8 further illustrates a coated fiber strand 322 exiting the die 308. In some embodiments, the reactive resin may also be injected into the passages 320 at multiple locations along the length of the passage, which may reduce fluid pressure at a specific location within the passage 320.

The shape or configuration of the passage 330 may be selected to ensure that backflow of the reactive resin does not occur. For example, the position and/or grade of the slope may be selected to ensure that backflow of the reactive resin does not occur within the passage. Similarly, the position of the injection die 336 within the passage 330 and/or in relation to the slope may be selected to ensure that the reactive resin is forced through the passage 330 by gravitational forces and frictional forces from the fiber strand 320. The length of the passage 330 and/or of the slope may also be selected to ensure that backflow of the reactive resin does not occur. The nozzle may be located in the vertical center of the die. The slope described above may be in a range of between 5 degrees and 50 degrees, though a range of between 10 degrees and 35 degrees is more common. In some cases, slopes with a higher than 50 degree angle may lead to damage of the fiber strands 320.

The injection nozzle 336 may include multiple outlets for each passage 330 as previously described. In some embodiments, each of the outlets may be individually controllable so that one of the outlets may be closed or shut off in order to stop injection of the reactive resin within a respective passage 330 in case backflow does occur in the passage, in case the passage becomes clogged or fouled, and/or in case a fiber strand 320 breaks or is otherwise damaged within the passage 330. In this manner, the remaining passage may continue to be used even when a problem occurs in an individual passage.

Figure 9:
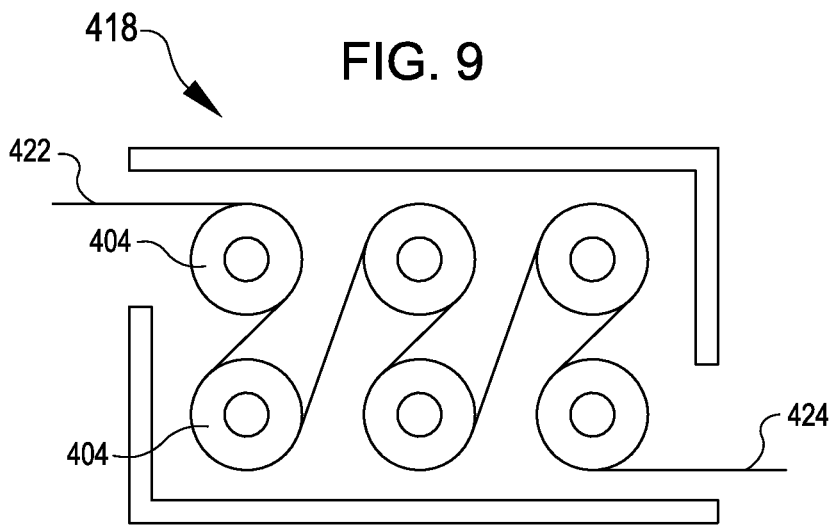
FIG. 9 is a reaction oven used in a tubular system for producing thermoplastic granules.

FIG. 9 shows an example embodiment of a compact curing oven 418. To ensure full polymerization of the monomers or oligomers, it is advantageous to extend the residence time of the fully impregnated fiber strand 422 within the curing oven without extending or increasing a length of the curing oven 418. To increase the residence time, the speed at which the fiber strand 422 progress through the oven 418 may be decreased, although this negatively impacts the speed at which the granules can be produced. To increase the residence time of the fiber strands 422 without decreasing a line speed, the compact curing oven 418 includes a number of rollers around which the fully impregnated fiber strands 422 are wound. Winding the fiber strands 422 around the rollers effectively increases a path or route along which the fiber strands 422 travel through the curing oven 418, which increases the residence time of the fiber strands 422 within the oven 418. In some embodiments, the curing oven 418 may include between 2 and 10 roller, and more commonly between 4 and 8 or 4 and 6 rollers. The use of the rollers may increase the path of the fiber strands 422 between 100 and 500 percent, and more commonly increase the path of the fiber strands 422 between 200 and 400 percent. The number of rollers to be used is determined based on the necessary curing time and space available for the oven. The curing oven 418 of FIG. 9 allows the residence time of the fiber strands 422 within the curing oven 418 to be increased without increasing the footprint of the system or slowing down production or output of the system.

In one example, a typical reaction time or residence time may be around 3 minutes. With a strand travel speed of 3 meters per minute, there must be around 9 meters of total length within the curing oven. The number of rollers may be determined based on the size available of the oven. For example, in relatively compact oven and spaces, the oven may employ an increased number of rollers to provide a sufficient number of turns for the fiber strands 422 and thereby ensure that the fiber strand remains within the oven for a sufficient amount of time (e.g., 3 minutes). In contrast, larger sized ovens and space may employ significantly fewer rollers or no rollers at all.

Figure 10:
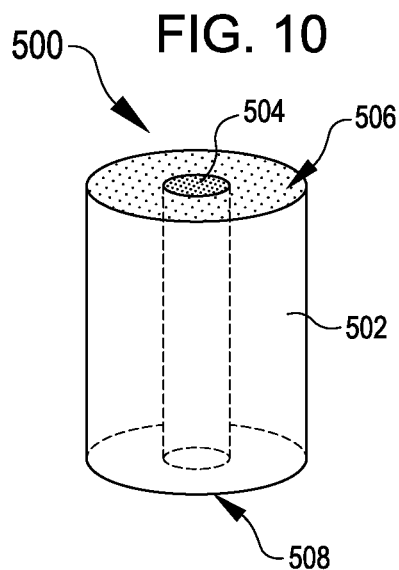
FIG. 10 is an example model of a thermoplastic granule formed according to the present disclosure.

FIG. 10 shows a granule 500 that is produced by systems and/or methods described herein. The granule 500 includes a thermoplastic shell 502 formed of polymerized monomers and/or oligomers. The granule 500 also includes a fiber strand 504 extending from a first end 506 to a second end 508 of the granule 500. The fiber strand 504 may be centrally located or centralized within the granule 500. In other embodiments, the fiber strand 504 may be along one edge, side, or offset from the center of the granule 500. The fiber strand 504 is fully impregnated with the thermoplastic material. The fiber strand 504 may be visible on the ends 506 and 508 of the granule in some embodiments. In other embodiments, the fiber strand 504 may occupy or form a portion of the end of the granule.

In some embodiments, the granule 500 may have a cylindrical shape, with circular or substantially circular faces that are perpendicular to an axis of the fiber strand 504. In other embodiments, the granule 500 may have other cross sectional shapes, including rectangular, trapezoidal, hexagonal, irregular, or other shapes. In some embodiments, the granule 500 may have a diameter in the range of 2 to 6 mm.

The granules 500 produced by the methods and systems result in improved physical properties for products that are formed from the granules 500. Comparison of existing fiber-reinforced polymer products with those produced using the granules 500 highlight structural and physical property differences. The longer fiber strands 504 contained within the granules 500 result in increased flexural strength, tensile strength, and flexural modulus. Because the fiber strands 504 are longer than fibers in conventional granules, the fiber-reinforced products produced using these granules are better reinforced due to the interlocking longer fiber strands.

As shown in Table 1 below, several injection molded test samples have been produced on a standard injection molding machine. The injection molding machine was fed with granules prepared according to the present disclosure. Comparative samples were prepared by using standard conventional methods (e.g. compounding in an extruder). Example 1 was made using conventional granules produced by mixing PA 6 resin with 10 µm chopped glass fibers. Example 2 was made using conventional granules produced similarly to Example 1 but using 13 µm chopped glass fibers. Examples 3 and 4 were made using granules produced according to this disclosure. Example 3 employed StarRov® 871 (2400 tex, 16 µm) roving that was impregnated with PA 6 resin as described herein and cut into a length of 3 mm. Example 4 employed StarRove 886 (2400 tex, 16 µm) roving but was otherwise produced similarly to Example 3. In addition, standard additives like stabilizers and anti-oxidants were added to the resin in an amount of less than 1%. The glass fiber content of all samples was set to 30%. The samples were tested and measured with the results summarized in Table 1 below.

TABLE 1

|  | Example | | | | Test method |
|---|---|---|---|---|---|
|  | 1 | 2 | 3 | 4 | |
| Glass fiber [wt. %] | 30.23 | 30.24 | 30.28 | 30.49 | ISO 11667 (DIN EN ISO 11667: 1999-10) |
| Tensile strength [MPa] | 165.8 | 160.4 | 185.8 | 180.1 | ISO 527-1: 2012-06 (DIN EN ISO 527-1: 2012-06) |
| Tensile modulus [MPa] | 9331 | 9235 | 9875 | 9616 | ISO 527-1: 2012-06 (DIN EN ISO 527-1: 2012-06) |
| Elongation at break [%] | 3.35 | 3.38 | 2.79 | 2.88 | ISO 527-1: 2012-06 (DIN EN ISO 527-1: 2012-06) |
| Charpy unnotched [kJ/m$^2$] | 87.4 | 78.9 | 72.2 | 80.7 | ISO 179-1/1eU (DIN EN ISO 179-1: 2006-05) |
| Charpy notched [kJ/m$^2$] | 12.4 | 13.0 | 19.7 | 19.0 | ISO 179-1/1e (DIN EN ISO 179-1: 2006-05) |
| Flexural Strength [MPa] | 250.4 | 244.8 | 268.6 | 263.3 | ISO 178 (DIN EN ISO 178: 2013-09) |
| Flexural Modulus [MPa] | 7528 | 7435 | 7801 | 7540 | ISO 178 (DIN EN ISO 178: 2013-09) |

In the granules 500, the fiber strands are longer and uniformly oriented, which results in improved physical properties. As illustrated in Table 1 above, experimental data shows the granules 500 exhibit improved tensile strength, tensile modulus, flexural modulus, and flexural strength as well as decreased elongation, which is likely due to the longer fiber strands. In comparison with conventional fiber reinforced thermoplastic materials, the granules 500 exhibited a tensile strength increase of between 8 to 17 percent, a tensile modulus increase of nearly 5 percent, a flexural modulus increase of nearly 3 percent, and a flexural strength increases of nearly 7 percent. The elongation of the granules 500 was reduced by between 15 and 20 percent. All of these improvements in properties were demonstrated with nearly identical fiber contents.

An additional benefit of the methods and systems disclosed herein is the ability of an end-user to produce granules for a master batch to produce fiber-reinforced products having any desired composition. The end-user may combine different proportions or percentages of different granules to result in different properties and strengths.

Figure 11:
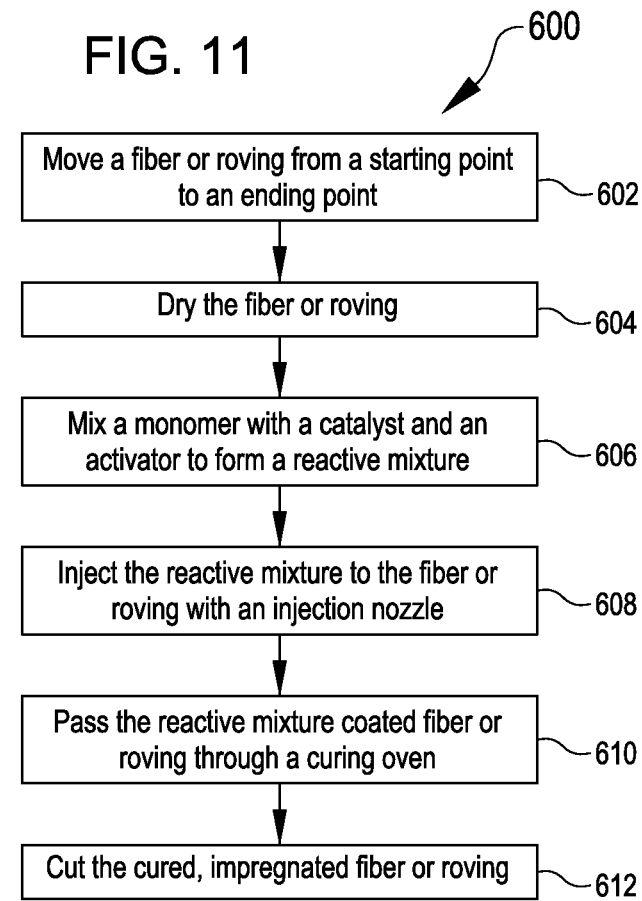
FIG. 11 is a flow diagram showing a method of forming thermoplastic granules.

FIG. 11 shows a flow diagram describing a method 600 of forming granules. The method 600 may be performed by any of the systems described herein, or by other devices or structures. At block 602, the method 600 comprises moving a fiber strand from a starting point to an ending point in a system. The fiber is dried or has moisture removed at block 604. The drying step may incorporate the use of heaters, drying ovens, fans, moisture free gases, or other devises and systems to reduce the moisture content and relative humidity on and/or around the fiber.

At block 606, a monomer is mixed with a catalyst and an activator to form a reactive mixture. According to some embodiments, the monomer may be individually mixed with the catalyst and the activator, with the two parts then mixed together in an appropriate ratio. At block 608, the reactive mixture is injected into contact with the fiber strand. The fiber strand may be in a passage, die, or on a conveyor belt as described herein. The reactive mixture has low viscosity and remains in contact with the fiber strand to fully impregnate and penetrate the fiber strand as well as to fully coat the fiber strand.

At block 610, the fully impregnated and/or coated fiber strand passes through a curing oven to polymerize the reactive mixture and form a fiber-reinforced thermoplastic rod. The thermoplastic polymerizes around and inside the fiber strand to form a rod of thermoplastic material that encapsulates and encloses a continuous fiber strand down the center of the thermoplastic material. In some embodiments, the fiber strand may be offset from the center of the rod, or may be along an edge of the rod.

At block 612, the thermoplastic rod with the impregnated fiber strand is cut into granules of a desired size and/or length. In some embodiments, multiple individual and parallel fiber-reinforced rods of thermoplastic material may be formed simultaneously. In other embodiments, a thermoplastic sheet may be formed that includes multiple fiber strands disposed within the thermoplastic sheet. In such embodiments, individual fiber-reinforced rods may be cut apart from the thermoplastic sheet during the cutting step. These individual fiber-reinforced rods may be further cut to form granules having a single impregnated fiber strand that extends along a full length of the granule.

The specification and drawings are, accordingly, to be regarded in an illustrative rather than a restrictive sense. It will, however, be evident that various modifications and changes may be made thereunto without departing from the broader spirit and scope of the disclosure as set forth in the claims. It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. As used herein, the terms "top" and "bottom" can be associated with vertical positions when the air legs of the cleaning machine are oriented vertically. However, in some cases, the cleaning machine may use air legs or configurations in non-vertical directions, in in which case the terms "top" and "bottom" may refer to positions not vertical but oriented diagonally as well. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for producing a fiber-reinforced thermoplastic material, the system comprising:
   a belt for moving a plurality of fiber strands continuously lengthwise through the system, the belt having a plurality of channels that extend lengthwise along the belt, wherein each channel is configured to receive one of the plurality of fiber strands so that each fiber strand is oriented parallel to an adjacent fiber strand and is spaced apart from an adjacent fiber strand as the plurality of fiber strands are moved through the system;
   an impregnation die positioned along a path of the plurality of fiber strands, the impregnation die having a plurality of channels, wherein each of the plurality of fiber strands passes through a respective one of the plurality of channels as each of the plurality of fiber strands is moved along the path through the system;
   an impregnation mechanism that is positioned within the impregnation die, the impregnation mechanism being configured to introduce a monomer into the plurality of channels so that the monomer contacts and fully impregnates the plurality of fiber strands as each fiber strand is moved through the respective one of the plurality of channels;
   a curing oven located downstream of the impregnation die and along the path of the plurality of fiber strands such that each fiber strand is moved through the curing oven, the curing oven being configured to polymerize the monomer and thereby form the fiber-reinforced thermoplastic material;
   a cutter located along the path of the plurality of fiber strands downstream of the curing oven, the cutter being configured to cut the fiber-reinforced thermoplastic material into lengths of between 1 and 100 mm; and
   wherein a portion of each of the plurality of channels of the impregnation die is oriented or angled downward so that an egress of the impregnation die is positioned vertically below the impregnation mechanism thereby limiting backflow of the monomer within the impregnation die.

2. The system of claim 1, further comprising a mixing component that is further configured to mix the monomer with a catalyst and an activator prior to introduction of the monomer within the plurality of channels of the impregnation die.

3. The system of claim 1, further comprising one or more rollers positioned within the curing oven along the path of the plurality of fiber strands so that each of the plurality of fiber strands is wound around each of the one or more rollers thereby increasing the path of the plurality of fiber strands within the curing oven.

4. The system of claim 3, wherein the curing oven operates at a temperature in a range of 100-250 degrees Celsius.

5. The system of claim 1, wherein the cutter is configured to cut the fiber-reinforced thermoplastic material into lengths of between 1 and 30 mm.

6. The system of claim 1, further comprising a gas purge mechanism that is positioned along the path of the plurality of fiber strands and that is configured to introduce a moisture-free gas to the plurality of fiber strands to create or maintain a substantially zero humidity environment around the plurality of fiber strands.

7. The system of claim 6, wherein the moisture-free gas is nitrogen.

8. The system of claim 1, wherein the monomer comprises caprolactam.

9. A system for producing a fiber-reinforced thermoplastic material, the system comprising:
   a belt that is configured to move a plurality of fiber strands continuously lengthwise through the system, the belt having a plurality of channels that extend lengthwise along the belt, wherein each channel is configured to receive one of the plurality of fiber strands so that each fiber strand is oriented parallel to an adjacent fiber strand and is spaced apart from an adjacent fiber strand as the plurality of fiber strands are moved through the system;
   an injection die having a plurality of injection nozzles, wherein each injection nozzle is positioned above a corresponding channel of the belt and wherein each injection nozzle is configured to introduce a monomer into the corresponding channel of the belt as the belt and plurality of fiber strands are moved past the injection die so that the monomer fully impregnates the plurality of fiber strands;
   a curing oven through which the belt and plurality of fiber strands pass after the monomer is introduced to the fiber strands via the injection die, the curing oven being configured to polymerize the monomer to create the fiber-reinforced thermoplastic material; and
   a cutter located downstream of the curing oven and configured to cut the fiber-reinforced thermoplastic material into a desired length.

10. The system of claim 9, further comprising a mixing component configured to mix the monomer with a catalyst and an activator prior to introduction of the monomer into the plurality of channels through the injection die.

11. The system of claim 9, wherein the cutter cuts the fiber-reinforced thermoplastic material to a length of between 1 and 30 mm suitable for injection molding.

12. The system of claim 9 wherein the cutter cuts the fiber-reinforced thermoplastic material to a length of between 1-100 mm suitable for compression molding.

13. The system of claim 9, further comprising a gas purge mechanism configured to introduce a moisture-free gas to the plurality of fiber strands to create or maintain a substantially zero humidity environment surrounding the plurality of fiber strands.

14. The system of claim 9, wherein the monomer comprises caprolactam.

15. The system of claim 14, wherein the curing oven operates at a temperature in a range of 120-220 degrees Celsius.

16. A system for producing a fiber-reinforced thermoplastic material, the system comprising:
a belt configured to move a plurality of continuous fibers lengthwise along the belt with each of the plurality of continuous fibers spaced apart from an adjacent continuous fiber, the belt having lateral edges that are configured to retain a monomer atop the belt and between the lateral edges so that the monomer remains in contact with the plurality of continuous fibers;
an injection die configured to introduce the monomer onto the belt as the plurality of continuous fibers are moved past the injection die so that the monomer fully impregnates the plurality of continuous fibers, the injection die comprising a plurality of distribution nozzles, each of the plurality of distribution nozzles being in vertical alignment with a respective one of the plurality of continuous fibers;
a curing oven through which the belt and the plurality of continuous fibers pass after the monomer is introduced to the plurality of continuous fibers via the injection die, the curing oven configured to polymerize the monomer to form the fiber-reinforced thermoplastic material; and
a first cutting mechanism that is positioned distally of the curing oven and that is configured to cut the fiber-reinforced thermoplastic material perpendicular to an axis of the continuous fibers to produce strips of the fiber-reinforced thermoplastic material.

17. The system of claim 16, further comprising a second cutting mechanism which cuts the strips of the fiber-reinforced thermoplastic material parallel to the axis of the continuous fibers to produce fiber-reinforced thermoplastic pellets or granules.

18. The system of claim 16, wherein the injection die is further configured to mix the monomer with a catalyst and an activator prior to introduction onto the belt through the injection die.

19. The system of claim 16, wherein the first cutting machine cuts the fiber-reinforced thermoplastic material to a length in a range of between 5-100 mm.

20. The system of claim 16 wherein the first cutting machine cuts the fiber-reinforced thermoplastic material to a length in a range of between 1-30 mm.

21. The system of claim 16, wherein the injection die and curing oven are maintained at substantially zero humidity.

22. The system of claim 16, wherein the first cutting mechanism has a width that is greater than a width of the fiber-reinforced thermoplastic material.

\* \* \* \* \*